(12) United States Patent
Kim et al.

(10) Patent No.: US 9,422,476 B2
(45) Date of Patent: Aug. 23, 2016

(54) LIQUID CRYSTAL COMPOSITION AND LIQUID CRYSTAL DISPLAY

(71) Applicant: Samsung Display Co., Ltd., Yongin, Gyeonggi-Do (KR)

(72) Inventors: Min-Jae Kim, Suwon-si (KR); Joon-Hyung Park, Seoul (KR); Min-Hee Kim, Ansan-si (KR); Keun Chan Oh, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/492,198

(22) Filed: Sep. 22, 2014

(65) Prior Publication Data

US 2015/0284633 A1    Oct. 8, 2015

(30) Foreign Application Priority Data

Apr. 4, 2014    (KR) .......................... 10-2014-0040603

(51) Int. Cl.
| | | |
|---|---|---|
| G02F 1/1333 | (2006.01) | |
| C09K 19/30 | (2006.01) | |
| G02F 1/1368 | (2006.01) | |
| G02F 1/1343 | (2006.01) | |
| G02F 1/1335 | (2006.01) | |
| G02F 1/1337 | (2006.01) | |
| C09K 19/54 | (2006.01) | |

(52) U.S. Cl.
CPC ............. *C09K 19/3066* (2013.01); *C09K 19/54* (2013.01); *G02F 1/1337* (2013.01); *G02F 1/1368* (2013.01); *G02F 1/133512* (2013.01); *G02F 1/133514* (2013.01); *G02F 1/133711* (2013.01); *G02F 1/134309* (2013.01); *C09K 2019/3004* (2013.01); *G02F 2001/133726* (2013.01)

(58) Field of Classification Search
CPC ............... C09K 19/3066; C09K 19/54; C09K 2019/3004; G02F 1/1368; G02F 1/134309; G02F 1/133512; G02F 1/133514; G02F 1/1337; G02F 1/133711; G02F 2001/133726
USPC ............... 252/299.01, 299.6, 299.63, 299.66; 349/182; 428/1.1
See application file for complete search history.

(56) References Cited

U.S. PATENT DOCUMENTS

| | | | |
|---|---|---|---|
| 5,965,060 A | 10/1999 | Tarumi et al. | |
| 6,066,268 A | 5/2000 | Ichinose et al. | |
| 6,174,572 B1 | 1/2001 | Hirschmann et al. | |
| 6,497,828 B1 | 12/2002 | Hirschmann et al. | |
| 7,731,865 B2 | 6/2010 | Bernatz et al. | |
| 7,767,109 B2 | 8/2010 | Pai et al. | |
| 8,277,907 B2 | 10/2012 | Klasen-Memmer et al. | |

FOREIGN PATENT DOCUMENTS

| | | | | |
|---|---|---|---|---|
| EP | 1146104 A2 | 10/2001 | | |
| JP | 3797389 B2 | 4/2006 | | |
| JP | 4876402 B2 | 12/2011 | | |
| JP | 4890648 B2 | 12/2011 | | |
| WO | WO 2013/187373 A1 * | 12/2013 | ............. | C09K 19/54 |

\* cited by examiner

*Primary Examiner* — Geraldina Visconti
(74) *Attorney, Agent, or Firm* — Cantor Colburn LLP

(57) ABSTRACT

A liquid crystal composition includes a first compound represented by following Chemical Formula 1, a second compound represented by following Chemical Formula 2, and at least one of a third compound represented by following Chemical Formula 3 and a fourth compound represented by following Chemical Formula 4.

Chemical Formula 1

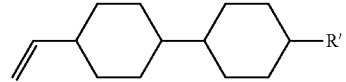

Chemical Formula 2

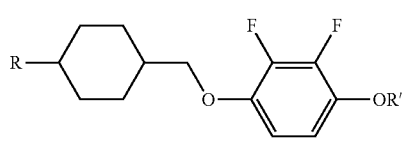

Chemical Formula 3

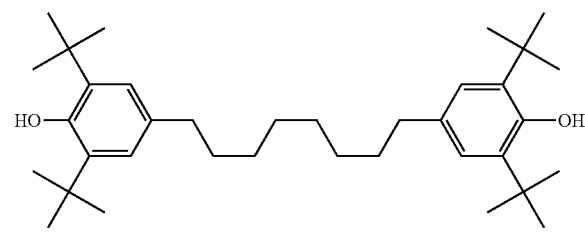

Chemical Formula 4

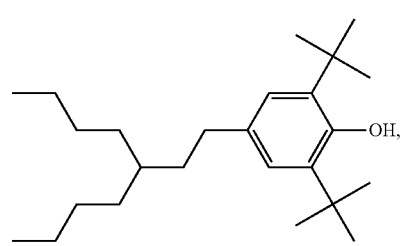

In which R and R' are independently an alkyl group or an alkoxy group.

17 Claims, 8 Drawing Sheets

LIQUID CRYSTAL COMPOSITION AND LIQUID CRYSTAL DISPLAY

This application claims priority to Korean Patent Application No. 10-2014-0040603 filed on Apr. 4, 2014, and all the benefits accruing therefrom under 35 U.S.C. §119, the content of which in its entirety is herein incorporated by reference.

BACKGROUND

1. (a) Field

The present invention relates to a liquid crystal composition and a liquid crystal display. More particularly, the present invention relates to a liquid crystal composition improving response speed and a liquid crystal display including the same.

2. (b) Description of the Related Art

A liquid crystal display element is used in watches, electronic calculators, various home appliances, measurement devices, panels for vehicles, word processors, electronic schedulers, printers, computers, televisions, and the like. Typical liquid crystal display systems include a twisted nematic ("TN") type, a super twisted nematic ("STN") type, a dynamic optical scattering ("DS") type, a guest and host ("GH") type, an in-plane switching ("IPS") type, an optically compensated birefringence ("OCB") type, an electrically controlled birefringence ("ECB") type, a vertical alignment ("VA") type, a color super homeotropic ("CSH") type, a ferroelectric liquid crystal ("FLH") type, or the like. Further, multiplex driving is generally used in known static driving as a driving method, such that a simple matrix method and currently an active matrix ("AM") method performing driving by a thin film transistor ("TFT"), a thin film diode ("TFD"), or the like are mainly used.

In the display methods, the IPS type, the ECB type, the VA type, the CSH type, or the like, are characterized in that a liquid crystal material having negative dielectric anisotropy ($\Delta \in$) is used, unlike a current general TN type or STN type. Among the display methods, in particular the VA type of liquid crystal display, AM driving is used in a display element requiring a wide viewing angle.

Low voltage driving, a high speed response, and a wide operation temperature range are desired characteristics of the liquid crystal material used in the VA type liquid crystal display and the like. That is, dielectric anisotropy is negative, an absolute value is high, viscosity is low, and a nematic phase-isotropic liquid phase transition temperature ("Tni") is high. Further, when setting $\Delta n \times d$, in which $\Delta n$ is a multiple of refractive anisotropy and d is a cell gap, the refractive anisotropy of the liquid crystal material needs to be controlled within an appropriate range so as to correspond to the cell gap. In addition, the cell gap of the display element may be small in order to implement a high speed response, but there is a limit in the reduction of the cell gap. It is useful when the liquid crystal composition having low viscosity is used in order to improve the response speed while the cell gap is not changed.

Three-dimensional ("3D") stereoscopic image display devices have attracted attention with the development of the liquid crystal display technology. For displaying the 3D image, a pattern retarder type and a shutter glasses type of liquid crystal display system may be used. In the case of the shutter glasses, the left eye signal and the right eye signal are applied at a predetermined time creating a need for high speed driving.

The above information disclosed in this Background section is only for enhancement of understanding of the background of the invention and therefore it may contain information that does not form the prior art that is already known to a person of ordinary skill in the art.

SUMMARY

The present invention provides a liquid crystal composition in which the response speed is improved, and a liquid crystal display using the same.

In exemplary embodiments, a liquid crystal composition includes a first compound represented by following Chemical Formula 1, a second compound represented by following Chemical Formula 2, and at least one of a third compound represented by following Chemical Formula 3 and a fourth compound represented by following Chemical Formula 4.

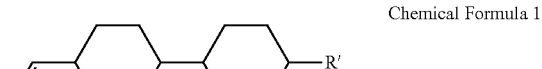

Chemical Formula 1

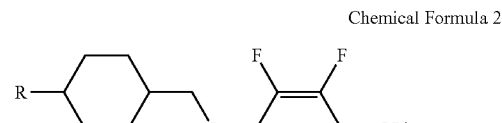

Chemical Formula 2

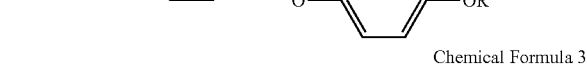

Chemical Formula 3

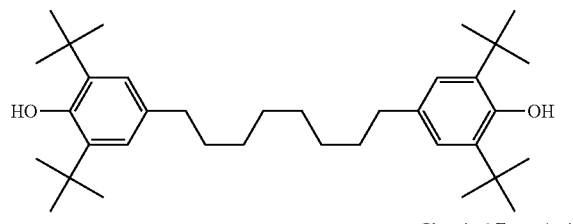

Chemical Formula 4

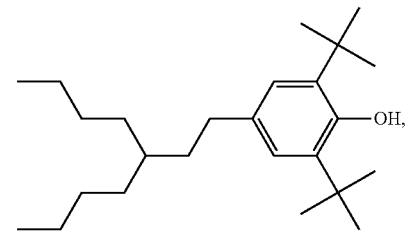

In which, R and R' are independently an alkyl group or an alkoxy group.

The liquid crystal composition includes the first compound, the second compound, and the third compound, and an amount of the third compound is more than about 0.1 part per million (ppm) to less than about 5000 ppm.

The liquid crystal composition includes the first compound, the second compound, and the fourth compound, and an amount of the fourth compound is more than about 0.1 ppm to less than about 5000 ppm.

In an exemplary embodiment, the liquid crystal composition further includes a fifth compound represented by following Chemical Formula 5.

Chemical Formula 5

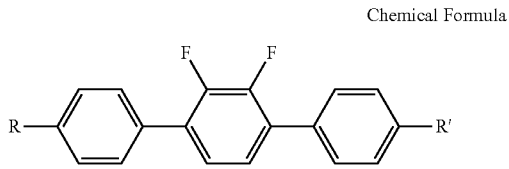

In which, R and R' are independently the alkyl group or the alkoxy group.

In an exemplary embodiment, the liquid crystal composition further includes a sixth compound represented by following Chemical Formula 6.

Chemical Formula 6

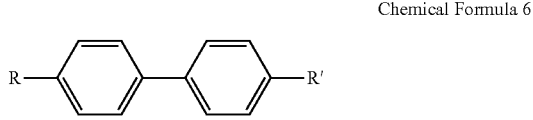

In which, R and R' are independently the alkyl group or the alkoxy group.

In an exemplary embodiment, the liquid crystal composition further includes a seventh compound represented by following Chemical Formula 7.

Chemical Formula 7

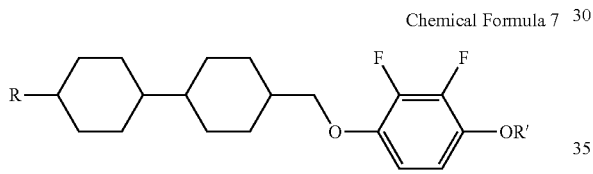

In which, R and R' are independently the alkyl group or the alkoxy group.

In one exemplary embodiment, the liquid crystal composition includes the first compound, the second compound, the third compound, the fifth compound, the sixth compound, and the seventh compound, and an amount of the third compound may be more than about 0.1 ppm to less than about 5000 ppm.

In another exemplary embodiment, the liquid crystal composition includes the first compound, the second compound, the fourth compound, the fifth compound, the sixth compound, and the seventh compound, and an amount of the fourth compound is more than about 0.1 ppm to less than about 5000 ppm.

The liquid crystal composition has a refractive anisotropy of about 0.080 to about 0.130.

The liquid crystal composition has a dielectric anisotropy of about −4.0 to about −2.5.

In exemplary embodiments, a liquid crystal display includes: a first substrate: a second substrate facing the first substrate; a field generating electrode on at least one of the first substrate and the second substrate; and a liquid crystal layer between the first substrate and the second substrate, and the liquid crystal layer includes a liquid crystal composition including a first compound represented by following Chemical Formula 1, a second compound represented by following Chemical Formula 2, and at least one of a third compound represented by following Chemical Formula 3 and a fourth compound represented by following Chemical Formula 4.

Chemical Formula 1

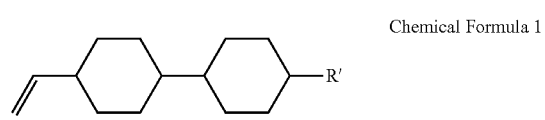

Chemical Formula 2

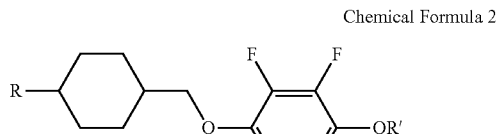

Chemical Formula 3

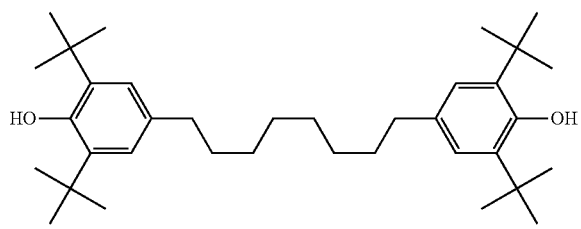

Chemical Formula 4

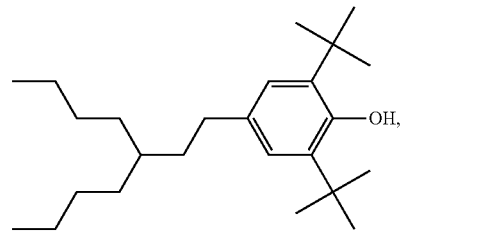

In which, R and R' are independently an alkyl group or an alkoxy group.

In one exemplary embodiment, the liquid crystal composition includes the first compound, the second compound, and the third compound, and an amount of the third compound is more than about 0.1 ppm to less than about 5000 ppm.

In another exemplary embodiment, the liquid crystal molecule includes the first compound, the second compound, and the fourth compound, and an amount of the fourth compound is more than about 0.1 ppm to less than about 5000 ppm.

The liquid crystal composition further includes a fifth compound represented by following Chemical Formula 5, a sixth compound represented by following Chemical Formula 6, and a seventh compound represented by following Chemical Formula 7.

Chemical Formula 5

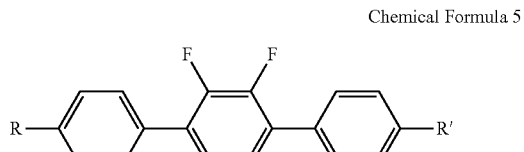

Chemical Formula 6

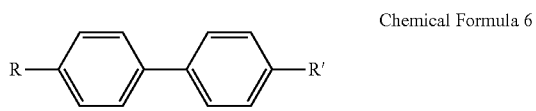

Chemical Formula 7

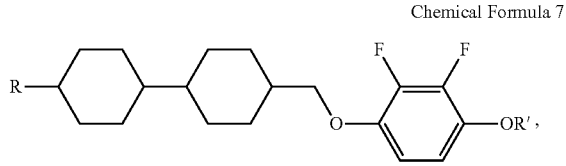

In which R and R' are independently the alkyl group or the alkoxy group.

The liquid crystal composition has a refractive anisotropy of about 0.080 to about 0.130.

The liquid crystal composition including the liquid crystal molecule has a dielectric anisotropy of about −4.0 to about −2.5.

In an exemplary embodiment, the liquid crystal display further includes an alignment layer positioned on the field generating electrode, and the alignment layer includes an aligning agent and an aligning polymer.

The first substrate is a thin film transistor substrate, the second substrate is a common electrode substrate, and at least one of a color filter and a black matrix are formed on the thin film transistor substrate.

The field generating electrode includes a pixel electrode on the first substrate and a common electrode on the second substrate, the pixel electrode includes a first cutout defined therein, the common electrode includes a second cutout defined therein, and the first cutout is arranged to alternate with the second cutout.

Liquid crystal molecules present in the liquid crystal composition are vertically aligned when an electric field is not present in the liquid crystal display.

In exemplary embodiments the liquid crystal composition and the liquid crystal display decrease the viscosity of the liquid crystal molecules such that the response speed and the afterimage are improved.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
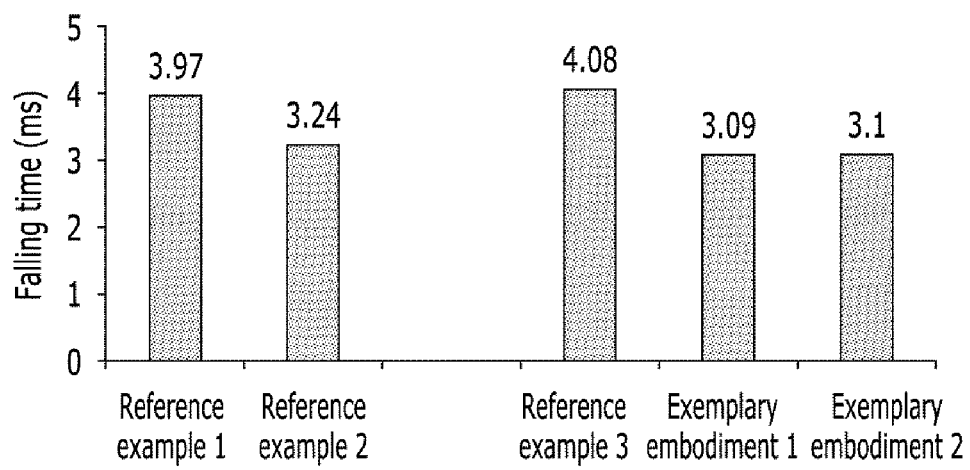
FIG. 1 is a graph illustrating the falling time of reference and exemplary liquid crystal compositions.

The present invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

For displaying a three-dimensional ("3D") image in 3D stereoscopic image display devices, a pattern retarder type and a shutter glasses type may be used as the liquid crystal display system. In the case of the shutter glasses, the left eye signal and the right eye signal are applied at a predetermined time such that high speed driving is required. To realize stable high speed driving, the response speed of the liquid crystal must be improved, particularly through the development of a liquid crystal composition having low viscosity.

For a high speed response of the liquid crystal display, a cell gap is decreased and characteristics of the liquid crystal material are improved, for example, as shown in Equation 1. Characteristics of the liquid crystal material include rotational viscosity and an elasticity coefficient.

$$T_{off}(\text{falling}) \propto \left(\frac{d}{\pi}\right)^2 \frac{Y1}{K_{eff}} \quad \text{[Equation 1]}$$

Equation 1 shows a factor affecting a response speed in views of a falling time Toff, which is a time required to change a white state into a black state. In Equation 1, d represents the cell gap, Keff represents the elasticity coefficient, and Y1 represents the rotational viscosity.

In the case where the response speed is improved by reducing the cell gap, even if the retardation of the liquid crystal layer is compensated by using liquid crystals having a high refractive index, there are problems in terms of quality and process, such as a reduction in yield and an increase in recognition of stains caused by foreign particles. Accordingly, it is preferable that the physical properties of the liquid crystal be improved so that the rotational viscosity is reduced and the elasticity coefficient is increased.

If the elasticity coefficient is increased, the falling time is improved, but the voltage-transmittance curve of the liquid crystals is moved to the right such that side effects of a threshold voltage (Vth) being increased and transmittance being reduced may occur. Therefore, it is important to design a liquid crystal composition in which liquid crystal components having a low molecular weight and low viscosity are mixed in high amounts in order to reduce the rotational viscosity, thus improving the response speed.

In exemplary embodiments, the liquid crystal composition may be designed so that the response speed is improved by using a material having low rotational viscosity.

In exemplary embodiments, the liquid crystal composition includes a first compound represented by the following Chemical Formula 1 and a second compound represented by the following Chemical Formula 2.

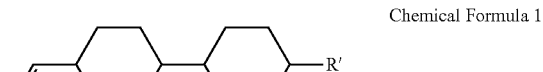

Chemical Formula 1

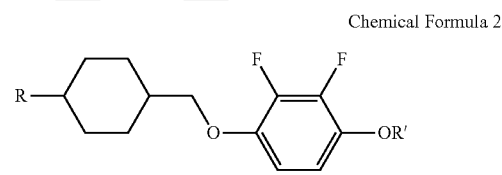

Chemical Formula 2

Herein, in Chemical Formula 1, R' is an alkyl group or an alkoxy group, and in Chemical Formula 2, R and R' may independently be the alkyl group or the alkoxy group.

Since the first compound includes the alkenyl group at an end, there is an effect that viscosity of the liquid crystal composition is improved as the content thereof is increased.

The second compound has high dielectric anisotropy and low viscosity.

In exemplary embodiments, the liquid crystal composition further includes at least one of a third compound represented by the following Chemical Formula 3 and a fourth compound represented by the following Chemical Formula 4.

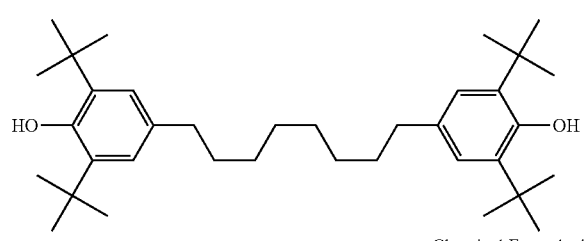

Chemical Formula 3

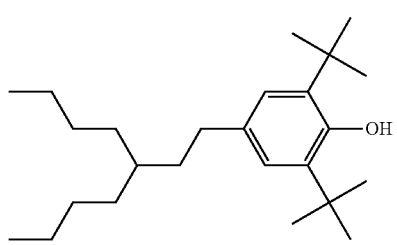

Chemical Formula 4

The third compound and the fourth compound may improve reliability of the liquid crystal composition. The liquid crystal composition together including the first compound and the second compound may have a linear afterimage, however in an exemplary embodiment, at least one of the third compound and the fourth compound is included such that the linear afterimage may be improved.

In exemplary embodiments, the liquid crystal composition may have a refractive anisotropy of about 0.080 to about 0.130. Also, the exemplary liquid crystal composition may have a dielectric anisotropy of about −4.0 to about −2.0.

In exemplary embodiments, the liquid crystal composition may further include a fifth compound represented by the following Chemical Formula 5.

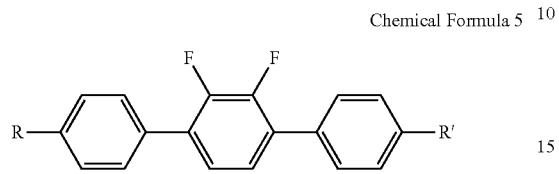

Chemical Formula 5

Herein, in Chemical Formula 5, R and R' are independently the alkyl group or the alkoxy group.

In exemplary embodiments, the liquid crystal composition may further include a sixth compound represented by the following Chemical Formula 6.

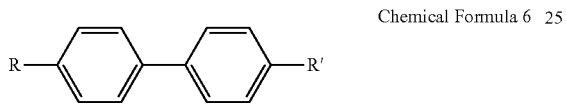

Chemical Formula 6

Herein, in Chemical Formula 6, R and R' are independently the alkyl group or the alkoxy group.

The fifth compound and the sixth compound are included in the liquid crystal composition for stably maintaining a nematic liquid crystal phase and exhibiting characteristics such as refractive index, viscosity, and the like.

In exemplary embodiments, the liquid crystal composition may further include a seventh compound represented by the following Chemical Formula 7.

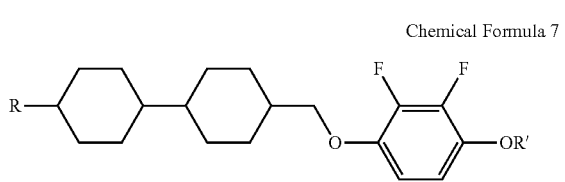

Chemical Formula 7

Herein, in Chemical Formula 7, R and R' are independently the alkyl group or the alkoxy group.

The seventh compound confers the negative dielectric anisotropy and increases the elasticity coefficient of the liquid crystal composition, thereby improving the electro-optical characteristics and the response speed of the liquid crystals.

In exemplary embodiments, the liquid crystal composition may include the first compound, the second compound, the third compound, the fifth compound, the sixth compound, and the seventh compound. In this case, the content of the first compound may be about 39 weight percent (wt %), the content of the second compound may be about 9 wt %, the content of the third compound may be about 500 ppm, the content of the fifth compound may be about 18 wt %, the content of the sixth compound may be about 5 wt %, and the content of the seventh compound may be about 29 wt %, based on the total weight of the liquid crystal composition. The amount of each compound in the liquid crystal composition is only one example, and the content of each compound may be variously changed. In this case, the content of the third compound may be more than about 0.1 ppm to less than 5000 ppm.

In other exemplary embodiments, the liquid crystal composition may include the first compound, the second compound, the fourth compound, the fifth compound, the sixth compound, and the seventh compound. In this case, the content of the first compound may be about 39 wt %, the content of the second compound may be about 9 wt %, the content of the fourth compound may be about 500 ppm, the content of the fifth compound may be about 18 wt %, the content of the sixth compound may be about 5 wt %, and the content of the seventh compound may be about 29 wt %, based on the total weight of the liquid crystal composition. The content of each compound of the liquid crystal composition is only one example, and the content of each compound may be variously changed. Here, the content of the fourth compound may be more than about 0.1 ppm to less than 5000 ppm.

Next, the response speed characteristics of the exemplary liquid crystal composition will be described with reference to FIG. 1 and compared with other reference examples.

FIG. 1 is a graph illustrating falling times of reference and exemplary liquid crystal compositions.

In FIG. 1, Reference Example 1 and Reference Example 3 represent liquid crystal compositions without the first compound including an alkenyl group. The Reference Example 2 is a liquid crystal composition which includes the first compound including the alkenyl group but does not include the second compound, the third compound or the fourth compound.

Exemplary Embodiment 1 is an exemplary embodiment of the liquid crystal composition which includes the first compound, the second compound, the third compound, the fifth compound, and the sixth compound. In this case, Exemplary Embodiment 1 includes about 39 wt % of the first compound, about 9 wt % of the second compound, about 500 ppm of the third compound, about 18 wt % of the fifth compound, about 5 wt % of the sixth compound, and about 29 wt % of the seventh compound, based on the total weight of the liquid crystal composition.

Exemplary Embodiment 2 is another exemplary embodiment of the liquid crystal composition which includes the first compound, the second compound, the fourth compound, the fifth compound, and the sixth compound. Here, the liquid crystal composition of Exemplary Embodiment 1 includes about 39 wt % of the first compound, about 9 wt % of the second compound, about 500 ppm of the fourth compound, about 8 wt % of the fifth compound, about 5 wt % of the sixth compound, and about 29 wt % of the seventh compound, based on the total weight of the liquid crystal composition.

Firstly, comparing Reference Example 1 and Reference Example 2, the falling time of Reference Example 1 is 3.97 milliseconds (ms), and the falling time of Reference Example 2 is 3.24 ms. By using the first compound including the alkenyl group in the liquid crystal composition, the falling time was improved by about 18% such that the response speed was improved.

Next, comparing Reference Example 3, Exemplary Embodiment 1, and Exemplary Embodiment 2, the falling time of Reference Example 3 is 4.08 ms, the falling time of Exemplary Embodiment 1 is 3.09 ms, and the falling time of Exemplary Embodiment 2 is 3.1 ms. By using the first compound including the alkenyl group in the liquid crystal composition, adding the second compound, and adding either the third compound or the fourth compound, the falling time was improved by about 24% such that the response speed was improved. In the case of Exemplary Embodiment 1 and Exemplary Embodiment 2, compared with Reference Example 2, it may be confirmed that the response speed is further improved.

Next, the linear afterimage characteristic of an exemplary embodiment of the liquid crystal composition is described with reference to FIG. 2.

Figure 2:
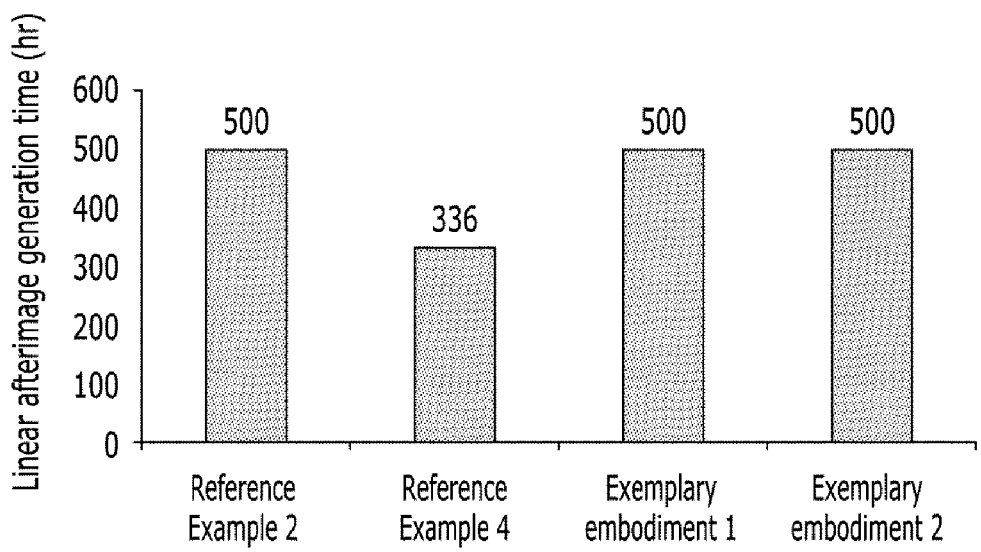
FIG. 2 is a graph illustrating estimated linear afterimage time of reference and exemplary liquid crystal compositions.

FIG. 2 is a graph illustrating estimates of a linear afterimage of reference and exemplary liquid crystal compositions.

Reference Example 4 is a liquid crystal composition including the first compound and the second compound but not the third compound or the fourth compound. Reference Example 2, Exemplary Embodiment 1, and Exemplary Embodiment 2 represent the generation time of the linear afterimage of the liquid crystal compositions of Reference Example 2, Exemplary Embodiment 1, and Exemplary Embodiment 2 in FIG. 1.

Firstly, comparing Reference Example 2 and Reference Example 4, the generation time of the linear afterimage of Reference Example 2 is 500 hours (hr) and the generation time of the linear afterimage of Reference Example 4 is 336 hours. By including the second compound in the liquid crystal composition, the generation time of the linear afterimage is further shortened such that the reliability is decreased.

Next, referring to Exemplary Embodiment 1 and Exemplary Embodiment 2, the generation time of the linear afterimage for both Exemplary Embodiment 1 and Exemplary Embodiment 2 is 500 hours. Thus, by further including the third compound or the fourth compound in the liquid crystal composition, the generation time of the linear afterimage is increased such that the reliability is increased.

That is, by including the first compound and the second compound in the liquid crystal composition, the response speed may be further improved, however the reliability may be decreased by the second compound. According to exemplary embodiments, by further including the third compound or the fourth compound in the liquid crystal composition, the response speed may be improved and simultaneously the reliability may also be increased.

Next, an exemplary embodiment of the liquid crystal display will be described with reference to FIG. 3.

Figure 3:
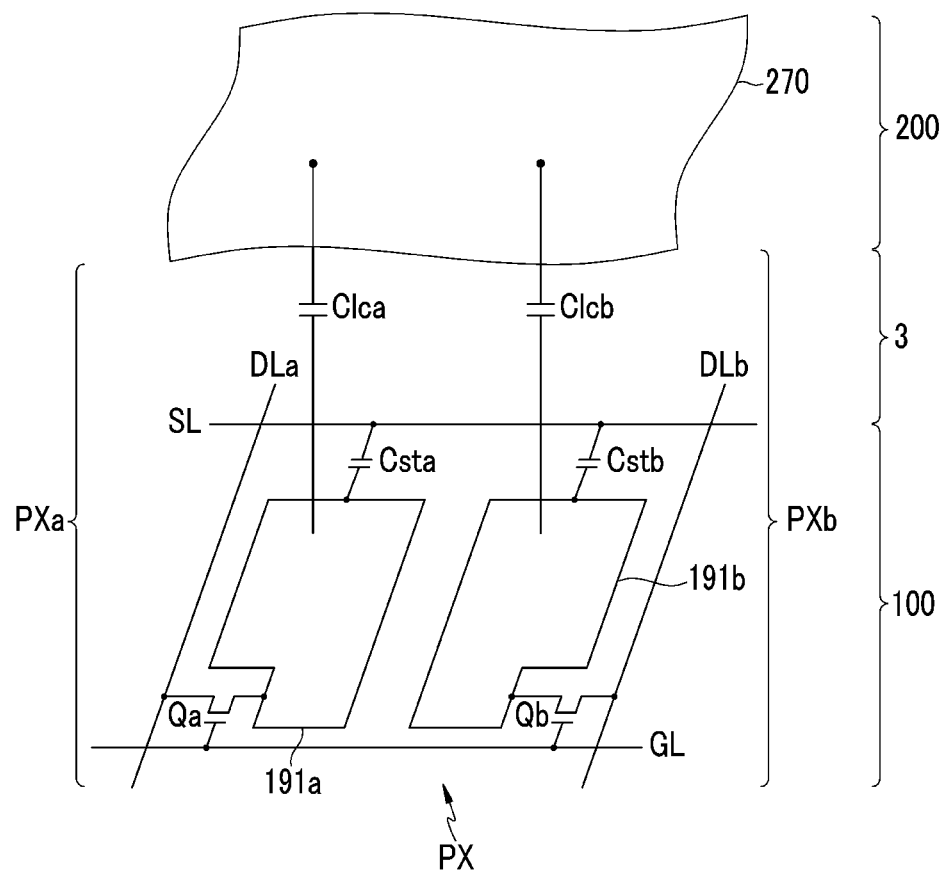
FIG. 3 is a circuit diagram of a pixel of an exemplary embodiment of a liquid crystal display.

FIG. 3 is a circuit diagram for a pixel of an exemplary embodiment of liquid crystal display.

Referring to FIG. 3, the exemplary liquid crystal display includes a lower display panel 100 and an upper display panel 200 that face each other, and a liquid crystal layer 3 interposed therebetween.

The liquid crystal display includes signal lines including a plurality of gate lines GL, a plurality pairs of data lines DLa and DLb, and a plurality of storage electrode lines SL, and a plurality of pixels PX connected thereto.

Each pixel PX includes a pair of subpixels PXa and PXb, and the subpixels PXa and PXb include switching elements Qa and Qb, liquid crystal capacitors Clca and Clcb, and storage capacitors Csta and Cstb.

The switching elements Qa and Qb are each a three terminal element such as a thin film transistor ("TFT") provided in the lower display panel 100, a control terminal (not shown) thereof is connected to the gate lines GL, an input terminal (not shown) is connected to the data lines DLa and DLb, and an output terminal (not shown) is connected to the liquid crystal capacitors Clca and Clcb and the storage capacitors Csta and Cstb.

The liquid crystal capacitors Clca and Clcb have subpixel electrodes 191a and 191b and a common electrode 270 as two terminals, and the liquid crystal layer 3 between the two terminals is formed of a dielectric material.

The storage capacitors Csta and Cstb, acting as auxiliary capacitors of the liquid crystal capacitors Clca and Clcb, are formed by overlapping the storage electrode line SL provided on the lower display panel 100 and the subpixel electrodes 191a and 191b with an insulator interposed therebetween, and a predetermined voltage such as a common voltage Vcom is applied to the storage electrode line SL.

Voltages charged in the two liquid crystal capacitors Clca and Clcb are set to be slightly different from each other. For example, the data voltage applied to the liquid crystal capacitor Clca is set to always be lower or higher than the data voltage applied to the other liquid crystal capacitor Clcb adjacent thereto. If the voltages of the two liquid crystal capacitors Clca and Clcb are appropriately controlled, an image seen from a lateral surface can closely approach an image seen from a front surface, thus lateral surface visibility of the liquid crystal display is improved.

Next, an exemplary embodiment of the liquid crystal display will be described with reference to FIG. 4 and FIG. 5.

Figure 4:
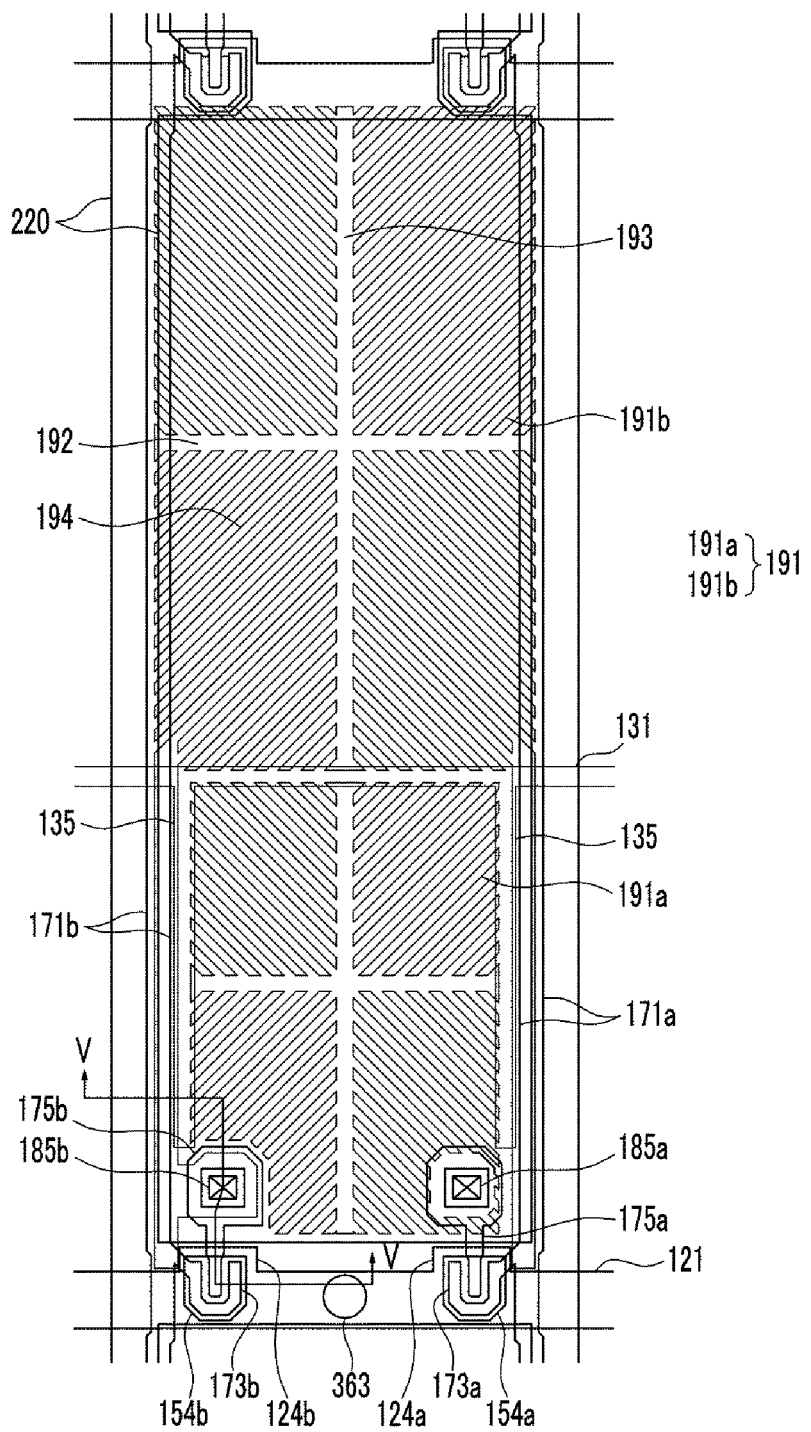
FIG. 4 is a plan view of the exemplary liquid crystal display.
Figure 5:
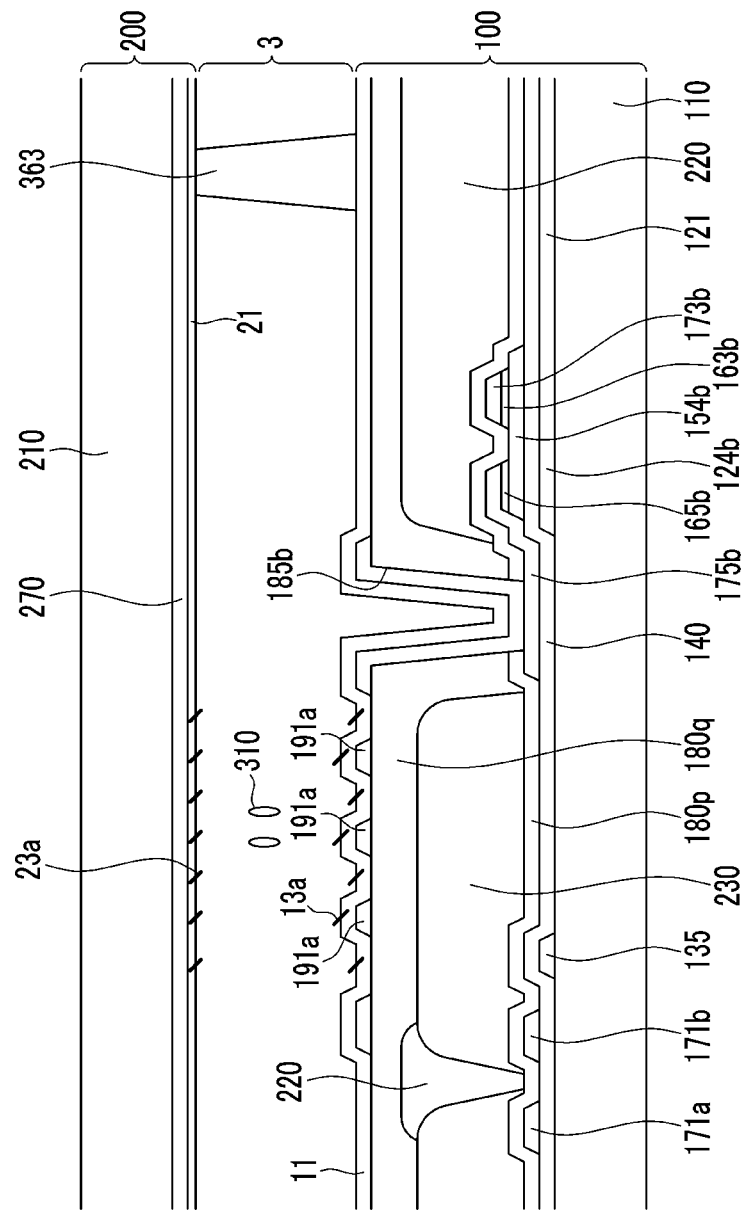
FIG. 5 is a cross-sectional view taken along a line V-V of the exemplary liquid crystal display FIG. 4.

FIG. 4 is a plan view of the exemplary liquid crystal display, and FIG. 5 is a cross-sectional view taken along line V-V of FIG. 4.

Referring to FIG. 4 and FIG. 5, the exemplary liquid crystal display includes the lower display panel 100 and the upper display panel 200 that face each other, and the liquid crystal layer 3 interposed between the two display panels 100 and 200.

First, the lower display panel 100 will be described.

A plurality of gate lines 121 and a plurality of storage electrode lines 131 and 135 are formed on an insulating substrate 110.

The gate lines 121 transfer a gate signal and mainly extend in a horizontal direction. Each gate line 121 includes a plurality of first and second gate electrodes 124a and 124b protruding upward.

The storage electrode lines 131 include stem lines extending substantially parallel to the gate lines 121, and a plurality of storage electrodes lines 135 extending therefrom. The shape and disposal of the storage electrode lines 131 and 135 may be changed into various forms.

The gate lines 121 and the storage electrode lines 131 and 135 may be formed of at least one of an aluminum-based metal such as aluminum (Al) and an aluminum alloy, a silver-based metal such as silver (Ag) and a silver alloy, and a copper-based metal such as copper (Cu) and a copper alloy.

The present exemplary embodiment describes that the gate lines 121 and the gate electrodes 124a and 124b are formed of a single layer, but is not limited thereto. In some embodiments, the gate lines 121 and the gate electrodes 124a and 124b may be formed to have a multilayer structure such as, for example, a dual layer or triple layer structure.

In the case where the gate lines and the gate electrodes have a dual-layer structure, the gate lines 121 and the gate electrodes 124a and 124b may be formed of a lower layer and an upper layer, and the lower layer may be formed of at least one selected from the group consisting of a molybdenum-based metal such as molybdenum (Mo) and a molybdenum alloy, chromium (Cr), a chromium alloy, titanium (Ti), a titanium alloy, tantalum (Ta), a tantalum alloy, manganese (Mn), and a manganese alloy. The upper layer may be formed of at least one of an aluminum-based metal such as aluminum (Al) and an aluminum alloy, a silver-based metal such as silver (Ag) and a silver alloy, and a copper-based metal such as copper (Cu) and a copper alloy. In the case of the triple layer structure, the gate lines and the gate electrodes may be formed by combination of layers having different physical properties.

A gate insulating layer 140 is formed on the gate lines 121 and the storage electrode lines 131 and 135, and a plurality of semiconductors 154a and 154b made of amorphous or crystalline silicon, and the like, are formed on the gate insulating layer 140.

A plurality pairs of ohmic contacts 163b and 165b are formed on the semiconductors 154a and 154b, and the ohmic contacts 163b and 165b may be made of a material such as n+ hydrogenated amorphous silicon in which a silicide or an n-type impurity is doped at a high concentration.

A plurality of pairs of data lines 171a and 171b and a plurality pairs of first and second drain electrodes 175a and 175b are formed on the ohmic contacts 163b and 165b and the gate insulating layer 140.

The data lines 171a and 171b transfer a data signal and mainly extend in a vertical direction to cross the stem of the gate line 121 and the storage electrode lines 131. The data lines 171a and 171b extend toward the first and second gate electrodes 124a and 124b and include first and second source electrodes 173a and 173b bent in a U-shape, and the first and second source electrodes 173a and 173b face the first and second drain electrodes 175a and 175b with the first and second gate electrodes 124a and 124b interposed therebetween.

The data lines 171a and 171b may be formed of at least one of an aluminum-based metal such as aluminum (Al) and an aluminum alloy, a silver-based metal such as silver (Ag) and a silver alloy, and a copper-based metal such as copper (Cu) and a copper alloy. The present exemplary embodiment describes that the data lines 171a and 171b are formed of a single layer, but is not limited thereto, and the data lines 171a and 171b may be formed to have a multilayer structure such as a dual layer or triple layer structure.

Each of the first and second drain electrodes 175a and 175b extends upward from an end thereof, which is partially surrounded by the first and second source electrodes 173a and 173b, and the other end thereof may have a wide area for connection to another layer.

However, the shape and disposal of the first and second drain electrodes 175a and 175b and the data lines 171a and 171b may be variously changed.

The first and second gate electrodes 124a and 124b, the first and second source electrodes 173a and 173b, and the first and second drain electrodes 175a and 175b form first and second thin film transistors Qa and Qb together with the first and second semiconductors 154a and 154b, and channels of the first and second thin film transistors Qa and Qb are formed in the first and second semiconductors 154a and 154b between the first and second source electrodes 173a and 173b and the first and second drain electrodes 175a and 175b.

The ohmic contacts 163b and 165b exist only between the semiconductors 154a and 154b therebeneath and the data lines 171a and 171b and the drain electrodes 175a and 175b thereon, and reduce contact resistance therebetween. In the semiconductors 154a and 154b, an exposed portion that is not covered with the data lines 171a and 171b and the drain electrodes 175a and 175b exists between the source electrodes 173a and 173b and the drain electrodes 175a and 175b.

A lower passivation layer 180p made of a silicon nitride or a silicon oxide is formed on the data lines 171a and 171b, the drain electrodes 175a and 175b and the exposed portions of the semiconductors 154a and 154b.

A color filter 230 is formed on the lower passivation layer 180p. The color filter 230 may include a color filter having three colors of red, green, and blue. A single layer or a dual layer of chromium and chromium oxide, or a light blocking member 220 made of an organic material is formed on the color filter 230. The light blocking member 220 may have openings arranged in a matrix form.

An upper passivation layer 180q formed of a transparent organic insulating material is formed on the color filter 230 and the light blocking member 220. The upper passivation layer 180q prevents the color filter 230 from being exposed and provides a flat surface. A plurality of contact holes 185a and 185b through which the first and second drain electrodes 175a and 175b are exposed, are formed on the passivation layer 180q.

A plurality of pixel electrodes 191 are formed on the upper passivation layer 180q. Each pixel electrode 191 may be made of a transparent conductive material such as ITO or IZO, or a reflective metal such as aluminum, silver, chromium, or an alloy thereof.

Each pixel electrode 191 includes the first and second subpixel electrodes 191a and 191b separated from each other, the first and second subpixel electrodes 191a and 191b each include a cross-type stem portion formed of a horizontal stem portion 192 and a vertical stem portion 193 crossing the horizontal stem portion, and fine branch portions 194 inclinedly extending from the horizontal stem portion 192 and the vertical stem portion 193.

Next, the upper display panel 200 will be described.

The common electrode 270 is formed on an entire surface of a transparent insulating substrate 210 in the upper display panel 200.

A spacer 363 is formed in order to maintain a space between the upper display panel 200 and the lower display panel 100.

Alignment layers 11 and 21 are respectively applied on internal surfaces of the lower display panel 100 and the upper display panel 200, and may be vertical alignment layers. The alignment layers 11 and 21 may be formed by including at least one generally-used material as the liquid crystal alignment layer such as polyamic acid or a polyimide. The alignment layers 11 and 21 include alignment polymers 13a and 23a formed by radiating light on an alignment aid. The alignment polymer is called a reactive mesogen.

A polarizer (not shown) may be provided on external surfaces of the lower display panel 100 and the upper display panel 200.

The liquid crystal layer 3 is interposed between the lower display panel 100 and the upper display panel 200. The liquid crystal layer 3 includes a liquid crystal composition including a plurality of liquid crystal molecules 310.

The liquid crystal molecules 310 have negative dielectric anisotropy, and are aligned so that a long axis thereof is almost perpendicular to surfaces of the two display panels 100 and 200 in a state where there is no electric field.

In exemplary embodiments, the liquid crystal layer 3 includes liquid crystal molecules 310 formed of the exemplary liquid crystal composition described herein. Specifically, in exemplary embodiments, the liquid crystal layer 3 includes a liquid crystal composition including the first compound represented by Chemical Formula 1 and the second compound represented by Chemical Formula 2.

Chemical Formula 1

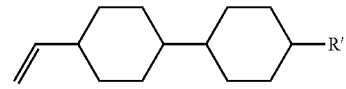

Chemical Formula 2

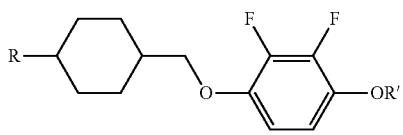

Herein, in Chemical Formula 1, R' may be an alkyl group or an alkoxy group, and in Chemical Formula 2, R and R' may independently be the alkyl group or the alkoxy group.

In exemplary embodiments, the liquid crystal composition further includes at least one of the third compound represented by Chemical Formula 3 and the fourth compound represented by Chemical Formula 4.

Chemical Formula 3

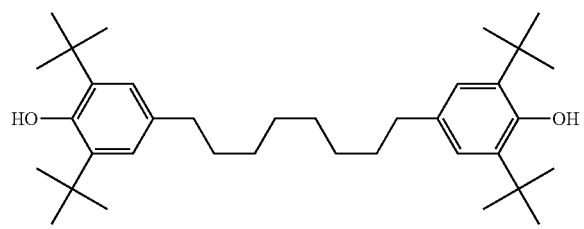

Chemical Formula 4

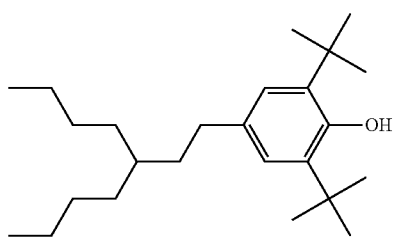

In an exemplary embodiment, the liquid crystal composition may further include the fifth compound represented by Chemical Formula 5, the sixth compound represented by Chemical Formula 6, and the seventh compound represented by Chemical Formula 7.

Chemical Formula 5

Chemical Formula 6

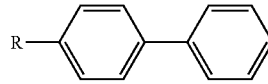

Chemical Formula 7

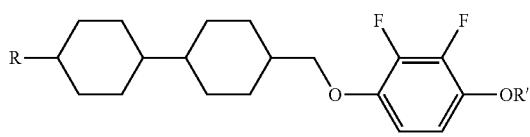

Herein, R and R' are independently the alkyl group or the alkoxy group.

The description of the exemplary liquid crystal composition described herein, may also be applied to the liquid crystal composition included in the liquid crystal layer 3 of the exemplary liquid crystal displays.

If a voltage is applied to the pixel electrode 191 and the common electrode 270, the liquid crystal molecules 310 respond to the electric field formed between the pixel electrode 191 and the common electrode 270, such that a direction of the long axis thereof is changed into a direction that is perpendicular to the direction of the electric field. The degree of change in polarization of light incident to the liquid crystal layer 3 varies according to the degree of inclination of the liquid crystal molecules 310. The change in polarization is shown by a change in transmittance by a polarizer, and the liquid crystal display displays an image therethrough.

The direction in which the liquid crystal molecules 310 are inclined is determined by the fine branch portions 194 of the pixel electrode 191, and the liquid crystal molecules 310 are inclined in a direction that is parallel to the length direction of the fine branch portions 194. Since one pixel electrode 191 includes four subregions where length directions of the fine branch portions 194 are different from each other, the liquid crystal molecules 310 are inclined in approximately four directions, and four domains where alignment directions of the liquid crystal molecules 310 are different from each other are formed in the liquid crystal layer 3. As described above, a viewing angle of the liquid crystal display may be improved by diversifying the inclination direction of the liquid crystal molecules.

In exemplary embodiments, the liquid crystal display may have a largely improved response speed by controlling a pre-tilt, that is an initial alignment direction of the liquid crystal molecules 310, by the alignment polymers 13a and 23a, which are formed by polymerization of the alignment aid through a design of the liquid crystal composition having low rotational viscosity.

Figure 6:
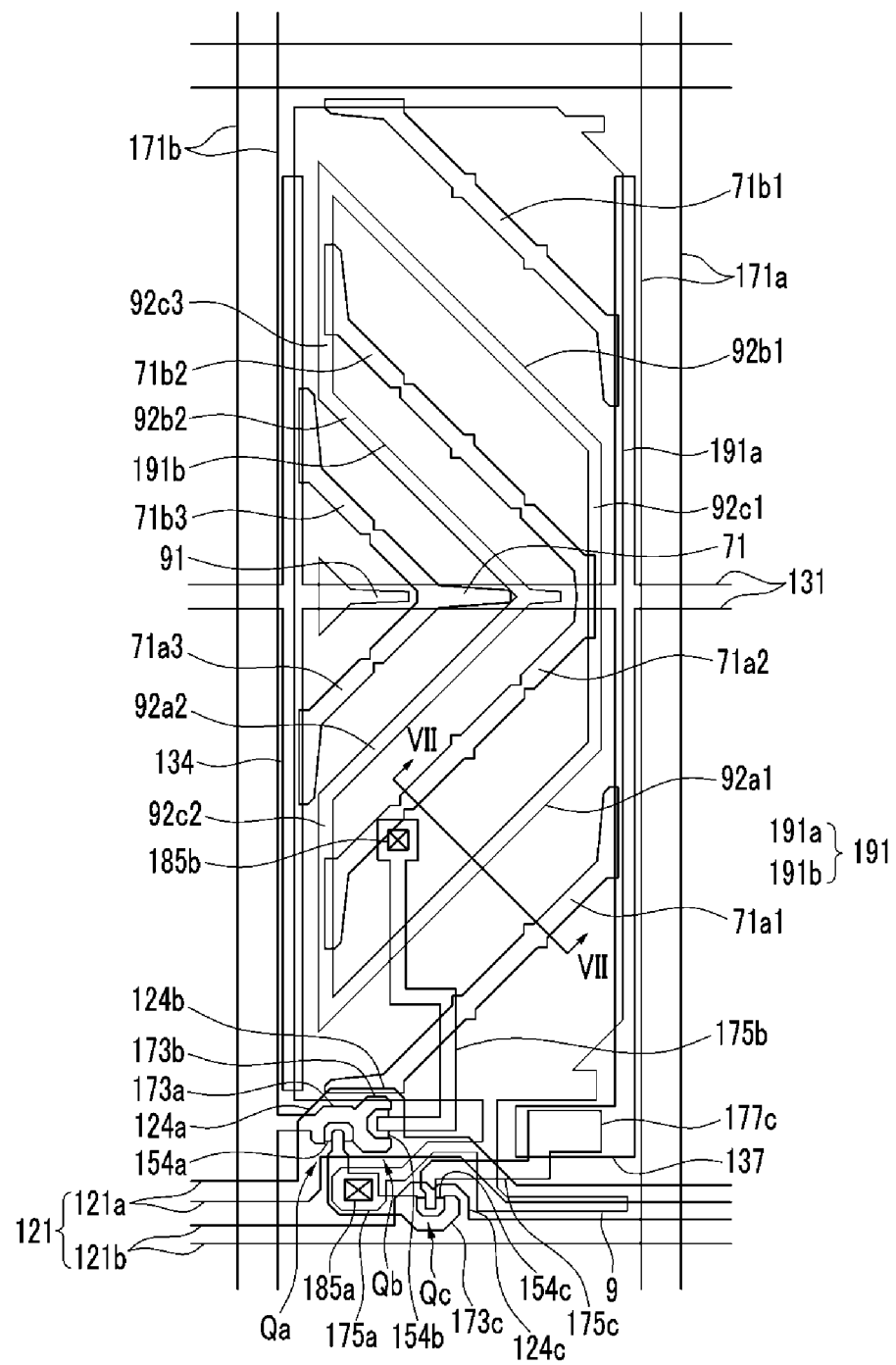
FIG. 6 is a plan view of a pixel of another exemplary embodiment of a liquid crystal display.
Figure 7:
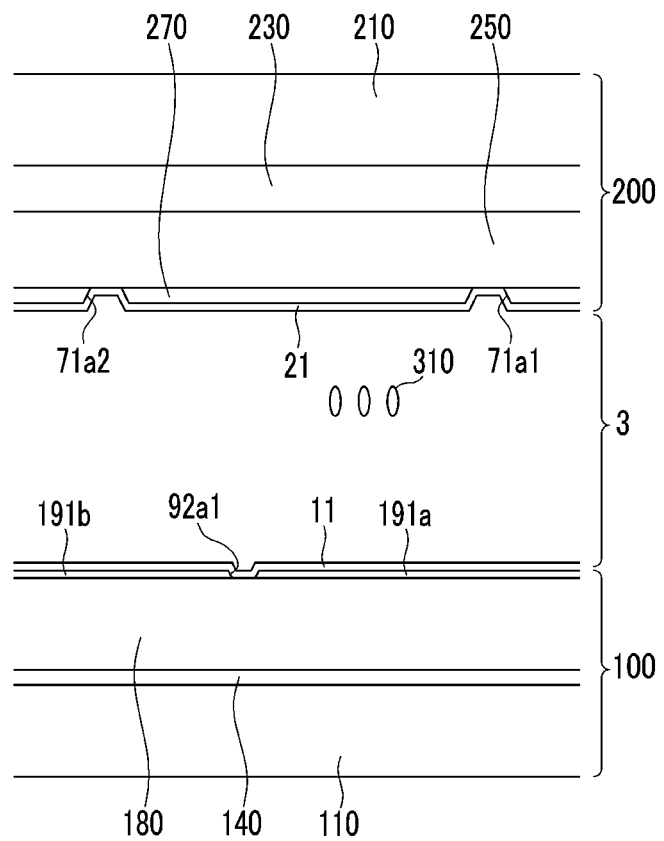
FIG. 7 is a cross-sectional view taken along a line VII-VII of the exemplary liquid crystal display of FIG. 6.

FIG. 6 is a plan view of an exemplary embodiment of the liquid crystal display, and FIG. 7 is a cross-sectional view taken along line VII-VII of the liquid crystal display in FIG. 6.

First, the lower display panel 100 will be described.

A plurality of gate lines 121 including a first gate line 121a and a second gate line 121b and a plurality of storage electrode lines 131 are formed on the insulating substrate 110.

The first gate line 121a and the second gate line 121b mainly extend in a horizontal direction, and a gate signal is transferred therethrough. The first gate line 121a includes the first gate electrode 124a and the second gate electrode 124b protruding upward, and the second gate line 121b includes a third gate electrode 124c. The first gate electrode 124a and the second gate electrode 124b are connected to each other to form one protrusion portion.

The storage electrode line 131 mainly extends in a horizontal direction, and a predetermined voltage such as a common voltage ("Vcom") is transferred therethrough. The storage electrode line 131 includes a pair of vertical portions 134 extending to be approximately perpendicular to the gate line 121, and a capacitive electrode 137 extending to protrude from the vertical portions 134.

The gate insulating layer 140 is formed on the gate lines 121 and the storage electrode lines 131, and a plurality of semiconductor stripes (not shown) that may be made of amorphous or crystalline silicon and the like are formed on the gate insulating layer 140. The semiconductor stripe mainly extends in a vertical direction, and includes first and second semiconductors 154a and 154b extending toward the first and second gate electrodes 124a and 124b and connected to each other, and a third semiconductor 154c positioned on the third gate electrode 124c.

A plurality of pairs of ohmic contacts (not shown) are formed on the semiconductors 154a, 154b, and 154c. The ohmic contacts may be made of a material such as n+ hydrogenated amorphous silicon to which silicide or an n-type impurity is doped at a high concentration.

A data conductor including a plurality of data lines 171a and 171b, a plurality of first drain electrodes 175a, a plurality of second drain electrodes 175b, and a plurality of third drain electrodes 175c is formed on the ohmic contacts.

The data lines 171a and 171b transfer a data signal therethrough, and mainly extend in a vertical direction to cross the first gate line 121a and the second gate line 121b. The data lines 171a and 171b include a first source electrode 173a and a second source electrode 173b extending toward the first gate electrode 124a and the second gate electrode 124b and connected to each other. The first source electrode 173a and the second source electrode 173b respectively face the first drain electrode 175a and the second drain electrode 175b with the first gate electrode 124a and the second gate electrode 124b interposed therebetween.

The first drain electrode 175a, the second drain electrode 175b, and the third drain electrode 175c include one rod-shaped end portion and the other end portion having a relatively wide area. The rod-shaped end portions of the first drain electrode 175a and the second drain electrode 175b are partially surrounded by the first source electrode 173a and the second source electrode 173b. One wide end portion of the first drain electrode 175a extends again to form a third source electrode 173c that is bent in a "U" form, and the third source electrode 173c faces a third drain electrode 175c. A wide end portion 177c of the third drain electrode 175c overlaps the capacitive electrode 137 to form a voltage drop capacitor Cstd (not shown), and the rod-shaped end portion is partially surrounded by the third source electrode 173c.

The first gate electrode 124a, the first source electrode 173a, and the first drain electrode 175a form a first thin film transistor Qa together with the first semiconductor 154a, the second gate electrode 124b, the second source electrode 173b, and the second drain electrode 175b form a second thin film transistor Qb together with the second semiconductor 154b, and the third gate electrode 124c, the third source electrode 173c, and the third drain electrode 175c form a third thin film transistor Qc together with the third semiconductor 154c.

The semiconductor stripe including the first semiconductor 154a, the second semiconductor 154b, and the third semiconductor 154c may have a flat shape that is substantially the same as those of data lines 171a, 171b, source electrodes 173a, 173b, 173c, drain electrodes 175a, 175b, and 175c and the ohmic contact therebeneath, with the exception of a channel region between the source electrodes 173a, 173b, and 173c and the drain electrodes 175a, 175b, and 175c.

An exposed portion that is not covered by the first source electrode 173a and the first drain electrode 175a is present between the first source electrode 173a and the first drain electrode 175a in the first semiconductor 154a, an exposed portion that is not covered by the second source electrode 173b and the second drain electrode 175b is present between the second source electrode 173b and the second drain electrode 175b in the second semiconductor 154b, and an exposed portion that is not covered by the third source electrode 173c and the third drain electrode 175c is present between the third source electrode 173c and the third drain electrode 175c in the third semiconductor 154c.

A passivation layer 180 that may be made of an inorganic insulator such as a silicon nitride or silicon oxide is formed on the data lines 171a, 171b, source electrodes 173a, 173b, 173c, drain electrodes 175a, 175b, and 175c and the exposed portions of the first, second, and third semiconductors 154a, 154b, and 154c.

The passivation layer 180 may be made of an organic insulator, and may have a flat surface. The passivation layer 180 may have a dual-layer structure including a lower inorganic layer and an upper organic layer so that excellent insulating characteristics of the organic layer are ensured and there is no damage to the exposed portions of the semiconductors 154a, 154b, and 154c.

A plurality of contact holes 185a and 185b through which the first drain electrode 175a and the second drain electrode 175b are exposed are formed in the passivation layer 180.

The pixel electrode 191 including the first subpixel electrode 191a and the second subpixel electrode 191b and a blocking electrode 9 are formed on the passivation layer 180. The pixel electrode 191 may be made of a transparent conductive material such as indium tin oxide ("ITO") or indium zinc oxide ("IZO"), or a reflective metal such as aluminum, silver, chromium, or an alloy thereof.

A horizontal central cutout 91, a vertical connecting cutout 92c1, lower diagonal cutouts 92a1, 92a2, lower connecting cutout 92c2, upper diagonal cutouts 92b1, 92b2, and lower connecting cutout 92c3 are formed in the pixel electrode 191, and the pixel electrode 191 is divided into a plurality of regions by these cutouts. The cutouts 91, 92a1, 92a2, 92c2, 92b1, 92b2, and 92c3 are almost inversely symmetric with a virtual horizontal central line dividing the pixel electrode 191 in half.

Specifically, lower diagonal cutouts 92a1, 92a2, and upper diagonal cutouts 92b1, and 92b2 are each positioned on a lower half and an upper half with respect to the horizontal central line of the pixel electrode 191, and vertical connecting cutout 92c1, and lower connecting cutouts 92c2, and 92c3 connect the upper and lower diagonal cutouts 92a1, 92a2, 92b1, and 92b2 to each other. The upper and lower diagonal cutouts 92a1, 92a2, 92b1, and 92b2 may extend to be approximately inclined from a right side of the pixel electrode 191 to a left side thereof, and may extend to be perpendicular to each other while forming an angle of about 45 degrees (°) with the gate line 121.

The lower half of the pixel electrode 191 is divided into two regions by the lower diagonal cutouts 92a1 and 92a2, and the upper half thereof is divided into two regions by the upper diagonal cutouts 92b1 and 92b2. Specifically, the lower diagonal cutouts 92a1 and 92a2, the upper diagonal cutouts 92b1 and 92b2, and the connection portions 92c1, 92c2, and 92c3 may form a closed circuit, and the pixel electrode 191 may be divided into the first subpixel electrode 191a and the second subpixel electrode 191b by the lower diagonal cutouts 92a1 and 92a2, the upper diagonal cutouts 92b1 and 92b2, and the vertical, upper and lower connecting cutouts 92c1, 92c2, and 92c3.

In this case, the number of pixel electrode regions or the number of cutouts may be changed according to design factors such as the size of the pixel electrode 191, a length ratio of a horizontal side and a vertical side of the pixel electrode 191, and a kind or a characteristic of the liquid crystal layer 3.

The first subpixel electrode 191a and the second subpixel electrode 191b are connected to the first drain electrode 175a and the second drain electrode 175b through the contact holes 185a and 185b, respectively, and receive the data voltage from the first drain electrode 175a and the second drain electrode 175b.

The first subpixel electrode 191a and the second subpixel electrode 191b to which the data voltage is applied generate an electric field together with the common electrode 270 of the upper display panel 200 to determine a direction of the liquid crystal molecules 310 of the liquid crystal layer 3 between two electrodes. The liquid crystal molecules of the liquid crystal layer aligned so as to be perpendicular to the surfaces of the two electrodes in a state where there is no electric field, lie in a direction that is parallel to the surfaces of the two electrodes, and luminance of light passing through the liquid crystal layer is changed according to the degree of lying of the liquid crystal molecules.

The first subpixel electrode 191a and the common electrode 270 form a first liquid crystal capacitor Clca together with the liquid crystal layer 3 therebetween, and the second subpixel electrode 191b and the common electrode 270 form a second liquid crystal capacitor Clcb together with the liquid crystal layer 3 therebetween to maintain the applied voltage even after the first and second thin film transistors Qa and Qb are turned off.

The first subpixel electrode 191a and the second subpixel electrode 191b each overlap the storage electrode line 131 to form the first storage capacitor Csta and the second storage capacitor Cstb, and the first storage capacitor Csta and the second storage capacitor Cstb each strengthen a voltage storage ability of the first liquid crystal capacitor Clca and the second liquid crystal capacitor Clcb.

The capacitive electrode 137 and the wide end portion 177c of the third drain electrode 175c overlap the gate insulating layer 140 with the semiconductor interposed therebetween to form a voltage drop capacitor Cstd. However, the semiconductor disposed between the capacitive electrode 137 and the wide end portion 177c of the third drain electrode 175c may be removed.

Hereinafter, the upper display panel 200 will be described.

The light blocking member (not shown) is formed on the insulation substrate 210 made of transparent glass, plastic, or the like. The light blocking member is called a black matrix, and serves to prevent light leakage between the pixel electrodes 191. The light blocking member has a plurality of openings (not shown) facing the pixel electrode 191 and having almost the same shape as the pixel electrode 191. However, the light blocking member may be formed of a portion corresponding to the gate lines 121a and 121b and the data lines 171a and 171b, and a portion corresponding to the thin film transistor.

A plurality of color filters 230 are formed on the substrate 210. Each color filter 230 may be mainly present in the region surrounded by the light blocking member, and may longitudinally extend in a vertical direction along a column of the pixel electrode 191. Each color filter 230 may display any one of the three primary colors of red, green, and blue color.

An overcoat 250 is formed on the color filter 230. The overcoat 250 may be made of an insulator, and prevents exposure of the color filter 230 and provides a flat surface. The overcoat 250 may be omitted.

The common electrode 270 is formed on the overcoat 250. The common electrode 270 is made of a transparent conductor such as ITO and IZO, and an assembly of a plurality of cutouts 71, 71a1, 71a2, 71a3, 71b1, 71b2, and 71b3 is formed in the common electrode 270.

The assembly of a plurality of cutouts includes a central cutout 71, first to third lower cutouts 71a1, 71a2, and 71a3, and first to third upper cutouts 71b1, 71b2, and 71b3.

The cutouts 71, 71a1, 71a2, 71a3, 71b1, 71b2, and 71b3 are each disposed between the adjacent lower diagonal cutouts 92a1, 92a2, and upper diagonal cutouts 92b1, and 92b2 of the pixel electrode 191, or between the lower diagonal cutouts 92a1, 92a2, the upper diagonal cutouts 92b1, and 92b2 of the pixel electrode and edges of the pixel electrode 191.

The assembly of a plurality of cutouts 71, 71a1, 71a2, 71a3, 71b1, 71b2, and 71b3 is almost inversely symmetrical with a virtual horizontal central line of the pixel electrode 191.

The cutout of the pixel electrode 191 and the cutouts of the common electrode 270 divide the pixel electrode 191 into a plurality of subregions, and each subregion has two primary edges forming an oblique angle with the primary edge of the pixel electrode 191. Since the liquid crystal molecules 310 on each subregion are mostly inclined in a direction that is perpendicular to the primary edge, inclination directions are approximately four directions.

As described above, a standard viewing angle of the liquid crystal display is increased by diversifying the inclination direction of the liquid crystal molecules 310.

Alignment layers 11 and 21 are applied on internal surfaces of the lower display panel 100 and the upper display panel 200, and may be vertical alignment layers. Specifically, the alignment layers 11 and 21 may be positioned on the pixel electrode 191 and the common electrode 270.

The polarizers (not shown) may each be provided on the outer surface of the display panels 100 and 200. Transmissive axes of the polarizers may be orthogonal to each other, and it is preferable that any one transmissive axis thereof be parallel to the gate line 121. In the case of the reflective liquid crystal display, any one of two possible polarizers may be omitted.

The liquid crystal layer 3 is interposed between the lower display panel 100 and the upper display panel 200. The liquid crystal layer 3 includes a liquid crystal composition including a plurality of liquid crystal molecules 310.

The liquid crystal molecules 310 have negative dielectric anisotropy, and are aligned so that long axes thereof are almost perpendicular to surfaces of the two display panels 100 and 200 in a state where there is no electric field.

In exemplary embodiments, the liquid crystal layer 3 includes the liquid crystal molecules 310 formed of the aforementioned exemplary liquid crystal composition. Specifically, in exemplary embodiments, the liquid crystal layer 3 includes the a liquid crystal composition including the first compound represented by Chemical Formula 1 and the second compound represented by Chemical Formula 2.

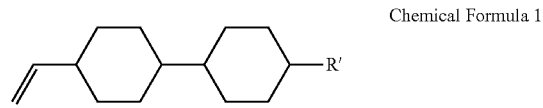

Chemical Formula 1

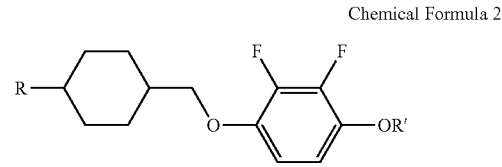

Chemical Formula 2

Herein, in Chemical Formula 1, R' may be an alkyl group or an alkoxy group, and in Chemical Formula 2, R and R' may independently be the alkyl group or the alkoxy group.

In exemplary embodiments, the liquid crystal composition further includes at least one of a third compound represented by Chemical Formula 3 and a fourth compound represented by Chemical Formula 4.

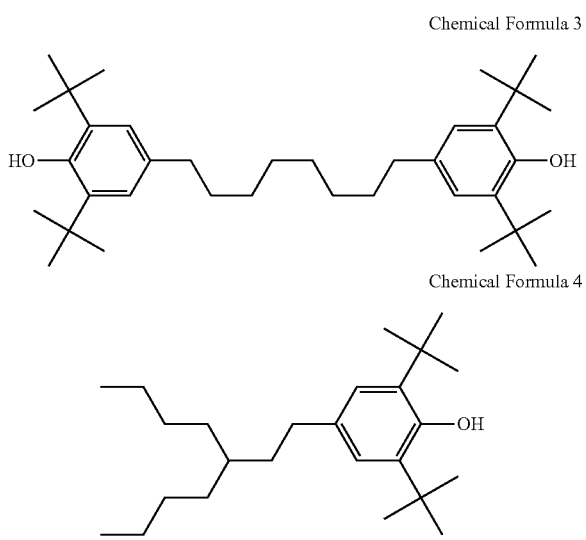

Chemical Formula 3

Chemical Formula 4

In exemplary embodiments, the liquid crystal composition may further include the fifth compound represented by Chemical Formula 5, the sixth compound represented by Chemical Formula 6, and the seventh compound represented by Chemical Formula 7.

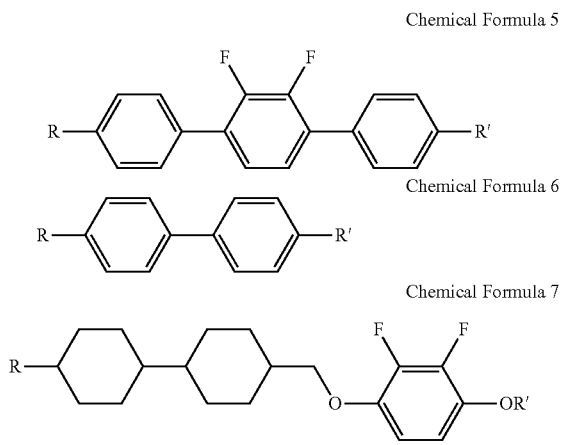

Chemical Formula 5

Chemical Formula 6

Chemical Formula 7

Here, in Chemical Formula 5, Chemical Formula 6, and Chemical Formula 7, R and R' are independently the alkyl group or the alkoxy group.

The description for exemplary embodiments of the liquid crystal composition described herein may also be applied to the liquid crystal composition included in the liquid crystal layer 3 of the exemplary liquid crystal display.

Figure 8:
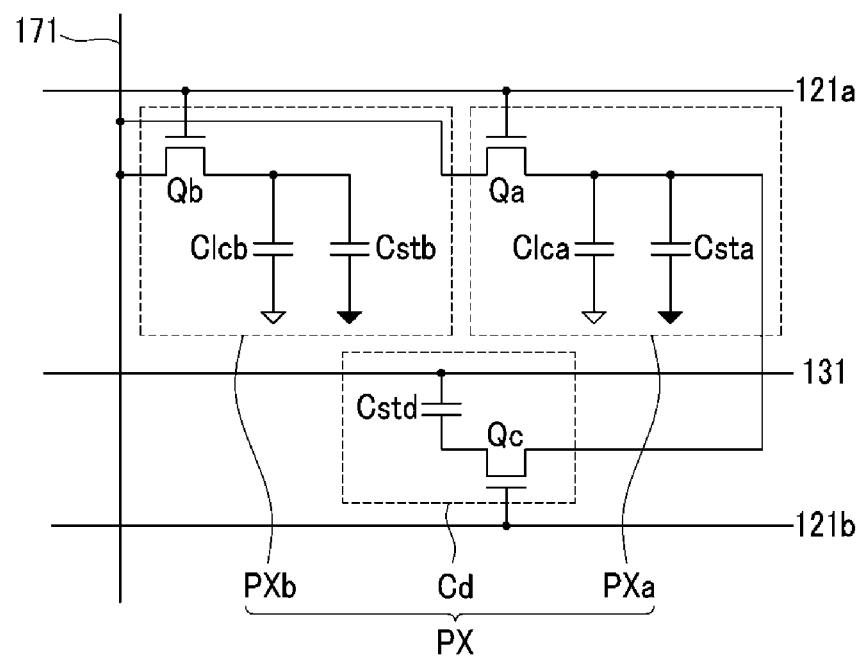
FIG. 8 is a circuit diagram of a pixel of the exemplary liquid crystal display shown in FIG. 6.

FIG. 8 is a circuit diagram for one pixel of the liquid crystal display shown in FIG. 6. Referring to FIG. 8, a structure and an operation of a circuit view of the liquid crystal display shown in FIG. 7 will be described.

The liquid crystal display according to the exemplary embodiment of the present invention includes signal lines including the first gate line 121a, the second gate line 121b, the storage electrode line 131, and the data line 171, and the pixel PX connected thereto.

The pixel PX includes a first subpixel PXa, a second subpixel PXb, and a voltage drop portion Cd.

The first subpixel PXa includes a first switching element Qa, a first liquid crystal capacitor Clca, and a first storage capacitor Csta, the second subpixel PXb includes a second switching element Qb, a second liquid crystal capacitor Clcb, and a second storage capacitor Cstb, and the voltage drop portion Cd includes a third switching element Qc and a voltage drop capacitor Cstd.

The first and second switching elements Qa and Qb are each a three terminal element such as a thin film transistor provided in a lower display panel, a control terminal thereof is connected to the first gate line 121a, an input terminal thereof is connected to the data line 171, and output terminals thereof are each connected to the first and second liquid crystal capacitors Clca and Clcb and the first and second storage capacitors Csta and Cstb.

The third switching element Qc is the three terminal element such as the thin film transistor provided in the lower display panel, the control terminal thereof is connected to the second gate line 121b, the input terminal thereof is connected to the first liquid crystal capacitor Clca, and the output terminal thereof is connected to the voltage drop capacitor Cstd.

The first and second liquid crystal capacitors Clca and Clcb are formed by overlapping the first and second subpixel electrodes 191a and 191b, which are connected to the first and second switching elements Qa and Qb, respectively, and the common electrode of the upper display panel. The first and second storage capacitors Csta and Cstb are formed by overlapping the storage electrode line 131 and the first and second subpixel electrodes 191a and 191b.

The voltage drop capacitor Cstd is connected to the output terminal of the third switching element Qc and the storage electrode line 131, and is formed by overlapping the storage electrode line 131 and the output terminal of the third switching element Qc provided in the lower display panel with an insulator interposed therebetween.

Operation of the liquid crystal display shown in FIG. 6 will now be described.

First, if a gate-on voltage ("Von") is applied to the first gate line 121a, the first and second thin film transistors Qa and Qb connected thereto are turned on.

Accordingly, the data voltage of the data line 171b is identically applied to the first and second subpixel electrodes 191a and 191b through the first and second switching elements Qa and Qb that are turned on. Since the first and second liquid crystal capacitors Clca and Clcb are charged by a difference between the common voltage (Vcom) of the common electrode 270 and the voltage of the first and second subpixel electrodes 191a and 191b, the charge voltage of the first liquid crystal capacitor Clca and the charge voltage of the second liquid crystal capacitor Clcb are the same. In this case, the gate-off voltage ("Voff") is applied to the second gate line 121b.

Next, if the gate-on voltage (Von) is applied to the second gate line 121b while the gate-off voltage (Voff) is applied to the first gate line 121a, the first and second switching elements Qa and Qb connected to the first gate line 121a are turned off, and the third switching element Qc is turned on. Accordingly, an electric charge of the first subpixel electrode 191a connected to the output terminal of the first switching element Qa flows into the voltage drop capacitor Cstd to reduce the voltage of the first liquid crystal capacitor Clca.

In an exemplary embodiment, the liquid crystal display is driven by frame inversion, and in the case where a data voltage having a positive (+) polarity based on the common voltage (Vcom) is applied to the data line 171 in the present frame as an example, negative (−) electric charges gather in the voltage drop capacitor Cstd after the prior frame is finished. If the third switching element Qc is turned on in the present frame, positive (+) electric charges of the first subpixel electrode 191a flow through the third switching element Qc into the voltage drop capacitor Cstd, thus, positive (+) electric charges gather in the voltage drop capacitor Cstd, and the voltage of the first liquid crystal capacitor Clca is reduced. In the next frame, on the contrary, the third switching element Qc is turned on in a state where negative (−) electric charges are charged in the first subpixel electrode 191a, thus negative (−) electric charges of the first subpixel electrode 191a flow into the voltage drop capacitor Cstd, such that negative (−) electric charges gather in the voltage drop capacitor Cstd and the voltage of the first liquid crystal capacitor Clca is reduced.

As described above, in an exemplary embodiment, the charge voltage of the first liquid crystal capacitor Clca may be set to always be lower than the charge voltage of the second liquid crystal capacitor Clcb regardless of the polarity of the data voltage. Accordingly, the charge voltages of the first and second liquid crystal capacitors Clca and Clcb may be set to be different from each other to improve lateral surface visibility of the liquid crystal display.

Unlike the present exemplary embodiment, the first and second switching elements Qa and Qb of the first and second subpixel electrodes 191a and 191b may each receive different data voltages obtained from one image information set through different data lines, or may each be connected to different gate lines to receive different data voltages obtained from one image information set at different times. Alternatively, only the first subpixel electrode 191a may receive the data voltage through the switching element, and the second subpixel electrode 191b may receive a relatively low voltage through capacitive bonding with the first subpixel electrode 191a. In the case of various exemplary embodiments as described above, the third switching element Qc, the voltage drop capacitor Cstd, and the like may be omitted.

Figure 9:
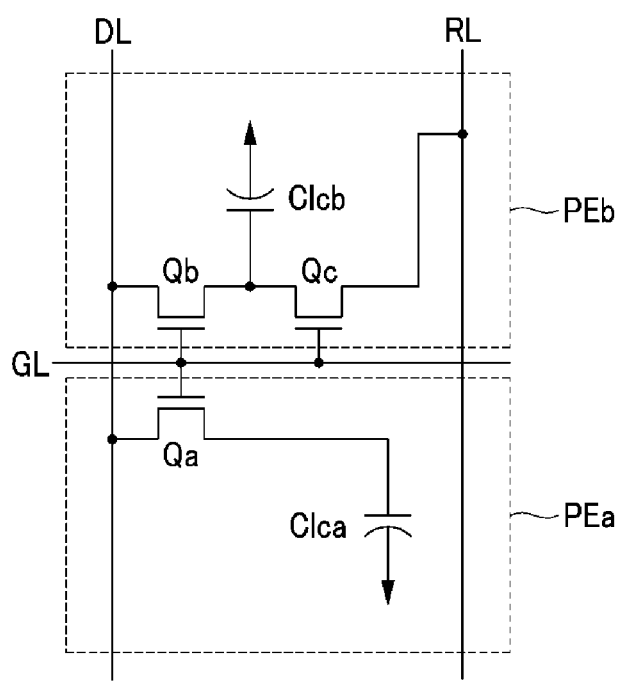
FIG. 9 is a circuit diagram of a pixel of an exemplary embodiment of a liquid crystal.

FIG. 9 is a circuit diagram of the pixel of an exemplary embodiment of the liquid crystal display.

Referring to FIG. 9, one pixel PX of the exemplary liquid crystal display includes a plurality of signal lines including a gate line GL through which a gate signal is transferred, a data line DL through which a data signal is transferred, and a reference voltage line RL through which a voltage division reference voltage is transferred, and the first switching element Qa, the second switching element Qb, and the third switching element Qc are connected to a plurality of signal lines, the first liquid crystal capacitor Clca, and the second liquid crystal capacitor Clcb.

The first switching element Qa and the second switching element Qb are connected to the gate line GL and the data line DL, respectively, and the third switching element Qc is connected to the output terminal of the second switching element Qb and the reference voltage line RL.

The first switching element Qa and the second switching element Qb are the three terminal elements such as the thin film transistor, the control terminal thereof is connected to the gate line GL, the input terminal thereof is connected to the data line DL, the output terminal of the first switching element Qa is connected to the first liquid crystal capacitor Clca, and the output terminal of the second switching element Qb is connected to the second liquid crystal capacitor Clcb and the output terminal of the third switching element Qc.

The third switching element Qc is the three terminal element such as the thin film transistor, the control terminal thereof is connected to the gate line GL, the output terminal thereof is connected to the second liquid crystal capacitor Clcb, and the input terminal thereof is connected to the reference voltage line RL.

If a gate-on (Von) signal is applied to the gate line GL, the first switching element Qa, the second switching element Qb and the third switching element Qc connected thereto are turned on. Accordingly, the data voltage applied to the data line DL is applied to the first subpixel electrode PEa and the second subpixel electrode PEb through the first switching element Qa and the second switching element Qb that are turned on. In this case, the data voltages applied to the first subpixel electrode PEa and the second subpixel electrode PEb may be charged by the same value. In an exemplary embodiment, the voltage applied to the second subpixel electrode PEb becomes a divided voltage through the third switching element Qc connected to the second switching element Qb in series. Accordingly, the voltage Vb applied to the second subpixel electrode PEb becomes smaller than the voltage Va applied to the first subpixel electrode PEa.

Accordingly, the voltage charged in the first liquid crystal capacitor Clca and the voltage charged in the second liquid crystal capacitor Clcb become different from each other. Since the voltage charged in the first liquid crystal capacitor Clca and the voltage charged in the second liquid crystal capacitor Clcb are different from each other, inclination angles of liquid crystal molecules in the first subpixel and the second subpixel become different from each other, and accordingly, the luminances of the two subpixels become different from each other. Therefore, if the voltage charged in the first liquid crystal capacitor Clca and the voltage charged in the second liquid crystal capacitor Clcb are appropriately controlled, an image viewed in a lateral surface may become close to an image viewed in a front surface as closely as possible, such that lateral surface visibility may be improved.

The exemplary embodiment of FIG. 9 is obtained by modifying a visible structure in the aforementioned exemplary embodiments of FIGS. 4 to 6, and the description of the liquid crystal composition included in the liquid crystal layer may be applied to any and all of the exemplary embodiments disclosed herein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal composition comprising
a compound represented by following Chemical Formula 1,
a compound represented by following Chemical Formula 2, and
a compound represented by following Chemical Formula 4:

Chemical Formula 1
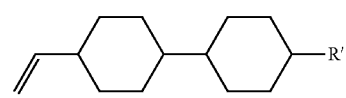

Chemical Formula 2
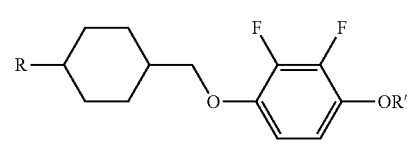

-continued

Chemical Formula 4

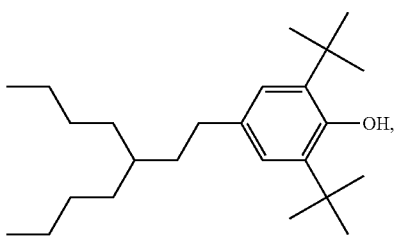

wherein R and R' are independently an alkyl group or an alkoxy group.

2. The liquid crystal composition of claim 1, wherein an amount of the compound of Chemical Formula 4 is more than about 0.1 ppm to less than about 5000 ppm.

3. The liquid crystal composition of claim 1, further comprising a compound represented by following Chemical Formula 5:

Chemical Formula 5

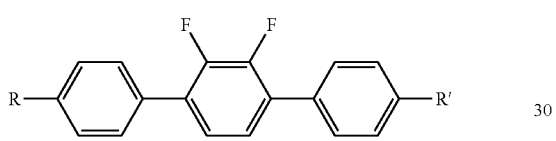

wherein R and R' are independently the alkyl group or the alkoxy group.

4. The liquid crystal composition of claim 3, further comprising a compound represented by following Chemical Formula 6:

Chemical Formula 6

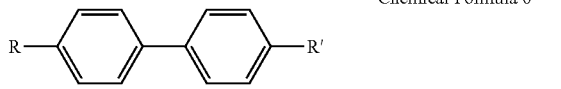

wherein R and R' are independently the alkyl group or the alkoxy group.

5. The liquid crystal composition of claim 4, further comprising a compound represented by following Chemical Formula 7:

Chemical Formula 7

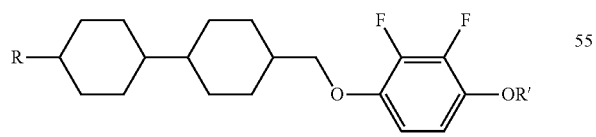

wherein R and R' are independently the alkyl group or the alkoxy group.

6. The liquid crystal composition of claim 5, wherein the liquid crystal composition comprises the compound of Chemical Formula 1, the compound of Chemical Formula 2, the compound of Chemical Formula 4, the compound of Chemical Formula 5, the compound of Chemical Formula 6, and the compound of Chemical Formula 7, and an amount of the compound of Chemical Formula 4 is more than about 0.1 ppm to less than about 5000 ppm.

7. The liquid crystal composition of claim 1, wherein the liquid crystal composition has a refractive anisotropy of about 0.080 to about 0.130.

8. The liquid crystal composition of claim 1, wherein the liquid crystal composition has dielectric anisotropy of about −4.0 to about −2.5.

9. A liquid crystal display comprising:

a first substrate:

a second substrate facing the first substrate;

a field generating electrode on at least one of the first substrate and the second substrate; and a liquid crystal layer between the first substrate and the second substrate, wherein the liquid crystal layer comprises a liquid crystal composition, wherein the liquid crystal composition comprises a compound represented by following Chemical Formula 1, a compound represented by following Chemical Formula 2, and a compound represented by following Chemical Formula 4:

Chemical Formula 1

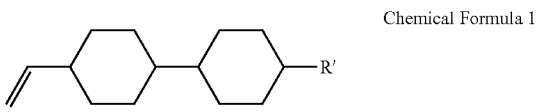

Chemical Formula 2

Chemical Formula 4

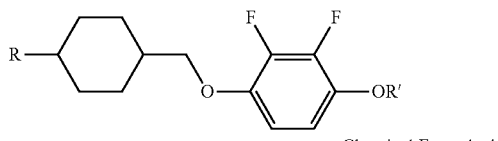

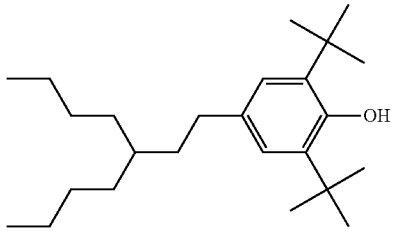

wherein R and R' are independently an alkyl group or an alkoxy group.

10. The liquid crystal display of claim 9, wherein an amount of the compound of Chemical Formula 4 is more than about 0.1 ppm to less than about 5000 ppm.

11. The liquid crystal display of claim 9, wherein the liquid crystal composition further comprises a compound represented by following Chemical Formula 5, a compound represented by following Chemical Formula 6, and a compound represented by following Chemical Formula 7:

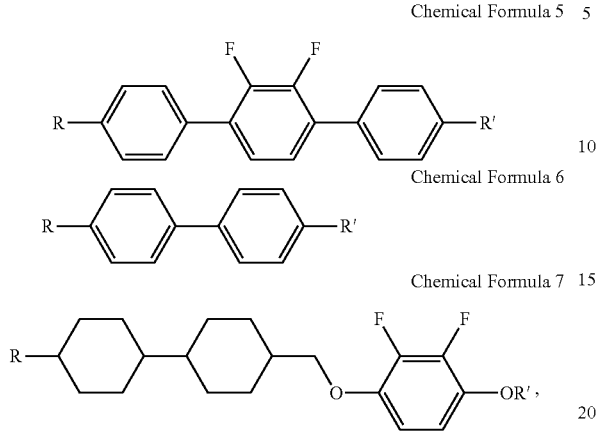

Chemical Formula 5

Chemical Formula 6

Chemical Formula 7 wherein R and R' are independently the alkyl group or the alkoxy group.

12. The liquid crystal display of claim 9, wherein the liquid crystal composition has a refractive anisotropy of about 0.080 to about 0.130.

13. The liquid crystal display of claim 9, wherein the liquid crystal composition has a dielectric anisotropy of about −4.0 to about −2.5.

14. The liquid crystal display of claim 9, further comprising
an alignment layer on the field generating electrode, wherein the alignment layer comprises an aligning agent and an aligning polymer.

15. The liquid crystal display of claim 9, wherein
the first substrate is a thin film transistor substrate,
the second substrate is a common electrode substrate, and
at least one of a color filter and a black matrix is disposed on the thin film transistor substrate.

16. The liquid crystal display of claim 9, wherein
the field generating electrode comprises a pixel electrode on the first substrate and a common electrode on the second substrate,
wherein a first cutout is defined in the pixel electrode,
a second cutout is defined in the common electrode, and
the first cutout is arranged to alternate with the second cutout.

17. The liquid crystal display of claim 9, wherein liquid crystal molecules present in the liquid crystal composition are vertically aligned when an electric field is not present in the liquid crystal display.

* * * * *